Patented Sept. 25, 1945

2,385,443

UNITED STATES PATENT OFFICE 2,385,443

PROCESS OF PREPARING CONCENTRATED TOXOIDS AND PRODUCT PRODUCED THEREBY

Josef Hoffmann, Paterson, N. J.

No Drawing. Application January 31, 1942, Serial No. 429,000

12 Claims. (Cl. 167—78)

This invention relates to toxoids useful in the treatment of arthritis and allied diseases such as rheumatic fever as well as in treating other allergic diseases caused by bacterial toxins, and to methods of preparation of such toxoids and their recovery in concentrated and standardized form.

It has long been suspected that the hemolytic streptococci were in some way identified with, and probably a causative factor of, arthritis, but the treatments heretofore applied based upon the use of vaccines prepared from the hemolytic streptococci have not proven satisfactory.

I have demonstrated in the course of my investigations in this field that arthritis is usually attributed to a general sensitization with streptococcic antigens and particularly of the joints or joint tissues, and that this sensitization apparently remains even after the immune bodies (agglutinins, precipitines, etc.) have disappeared.

My invention has for an object to produce a toxoid preparation that may be used in a practical and safe manner by the physician in bringing about a desensitization of the joint and joint tissues of patients suffering from arthritis, particularly arthritis of the types known as rheumatoid, osteo and mixed arthritis.

The present invention is based upon experiments conducted on rabbits, mice, rats, and guinea pigs, with a large variety of bacterial groups and single strains, namely:

Beta hemolytic streptococci
*Streptococcus viridans*
Indifferent streptococci
A group of pneumococci consisting of types I to XVIII—types VI, XIII, XV, XVI and XVII missing
Typhoid
Para typhoid "A" and para typhoid "B"
The dysentery group
Brucella group
Organisms belonging to the gonococcus group.

Of all these organisms tested, only a selected group of beta hemolytic streptococci have proved their ability to produce a non-suppurative rheumatoid, osteo and mixed arthritis in mice and rabbits which is comparable with the disease as encountered in humans. Likewise, only those toxoid concentrates produced from this selected group of hemolytic streptococci appear to be effective in desensitizing patients suffering from rheumatoid, osteo or mixed arthritis.

I have further found that the toxoids specific to those strains of hemolytic streptococci which are capable of producing non-suppurative lesions in rabbits and mice, similar to those found in arthritic patients, have the ability to produce positive skin and joint reactions in arthritic patients, and when injected intradermally and intramuscularly in appropriate amounts and over a suitable period, depending upon the reactivity of the particular patient and the activity of the particular toxoid preparation employed, it is possible to effect a desensitization of the arthritic patient with consequent amelioration of the arthritic condition and in a large percentage of cases to cause all symptoms of arthritis to disappear.

In practicing my invention, therefore, the first step consists in testing the strain or strains of hemolytic streptococci, whether they are isolated from foci of infection in arthritic patients or from other sources, to establish whether or not they have the ability to produce non-suppurative arthritis in mice and rabbits. Having made this determination, a strain showing such ability is selected. The organisms of this strain are kept virulent by mouse passage. The primary culture is then cultivated according to known procedures, and after an appropriate period of growth in a suitable medium is entirely freed of the organisms present. This may be accomplished by adding 5 grams of kaolin and filtering through filter paper and by further filtration of this filtrate through a Seitz filter. The clear filtrate is then treated to recover the toxoid in concentrated form. As recovered according to my method, the toxoid is purified to such an extent that the foreign proteins present in the medium are greatly reduced.

The step of concentrating the toxoid and freeing it in large measure from other substances normally present in the filtrate is important since I have found that skin tests with filtrates of the selected strains of streptococci are much less specific than those carried on with the toxoid concentrate. This is explained by the fact that a filtrate represents nearly as much material capable of producing the arthritic sensitization in human beings as vaccines owing to the fact that it contains various soluble protein substances derived from the culture medium or the bacteria besides the toxoid specific to the particular streptococcus strain. It is clear from my experiments and prolonged treatment of patients that the procedure of concentration eliminates the larger part if not all of these undesired sensitizing substances. In effecting the concentration I prefer to utilize the novel procedure hereinafter more particularly described.

By way of example, the primary culture after mouse passage and preferably taken from the heart of the mouse, is inoculated into a flask containing 1000 cc. of tryptose phosphate broth with .3% of dextrose. This culture is examined after 24 hours for purity, morphology, staining properties and the ability to produce hemolysis on blood agar. If satisfactory, .2% of formaldehyde and 5 grams of infusorial earth or other suitable filter aid are added to the culture and then the culture is well shaken and filtered through filter paper until entirely clear. The clear filtrate is then passed through a Seitz filter to insure removal of all bacterial bodies. The pH is adjusted to about 4.5, for example, and then 35-40 cc. of saturated salicylic acid in acetone is added drop by drop accompanied by vigorous stirring of the liquid. The resulting precipitate is separated by filtering or centrifuging. The salicylic acid is separated and removed from the active material by washing the precipitate several times with acetone and the washed precipitate is finally dried, preferably in vacuum. The dried precipitate may then be redissolved in 100 cc. of .3% phenol in physiological saline solution. The resulting solution is then permitted to stand in an icebox for 24 hours, and the pH is readjusted to 7.2. The solution is then filtered first through paper and finally through a Seitz filter. It is finally tested for sterility and, if sterile, is acceptable for standardization and use.

Standardization is accomplished by injecting a newly prepared concentrate solution prepared as above described, intravenously, into a number of rabbits. This permits observations concerning possible toxic reactions on such animals. As elucidated later no such reactions have been observed. By observing the leucocytic response of the animal a further guard is established against any possible damage which would manifest itself by a lowering of the total number of the leucocytes. At this stage the concentrate is further standardized by skin testing sensitized rabbits. The toxoid concentrate may be diluted further if reactions are found to be too strong.

If the reaction is within 1 to 2+, the concentrate is ready for final dilution with an equal volume of physiological saline, which I have found by experiments is the proper dilution and which takes into account the ratio of skin sensitivity of rabbit to human being that it is desirable to maintain in using the concentrate for desensitizing human beings suffering from arthritis. By reaction of 1+ I mean a reaction represented by erythema of the skin in an area of about .5 cm. in diameter, and by reaction of 2+ I mean the reaction shown by erythema of .5 to 2 cm. in diameter and a slight induration in the center.

In practice, the standardized antigens of a number of different strains which have been further diluted to one-half the concentration productive of the optimum skin reaction intensity established for the concentrate in testing rabbits, will be provided for use by the physician. The physician will subject the arthritic patient to routine skin testing by each of the concentrates in his stock. Dilution of this stock is recommended, particularly for the initial testing and for known sensitive patients, in proportions of 1 to 10 or even higher.

The procedure of skin testing with these concentrates is as follows:

Assuming that he has been supplied with the antigen concentrate diluted with a .3% phenol physiological saline solution to one-half of the concentration productive of the optimum skin reaction intensity established for the concentrate in testing rabbits, the physician will further dilute a portion of this concentrate in a proportion of 1 to 10 for use in the initial skin test on his patient. About .02 cc. of this dilute toxoid solution may be injected intradermally, using a tuberculin syringe with a 27 gauge short beveled needle. A satisfactory positive reaction will be evidenced if a wheal 2 to 3 mm. in diameter is produced as a result of this injection. The advantage of this dilution (1 to 10) is its greater specificity. No undue or severe reactions have been observed in this dilution. If the patient responds negatively to his initial test with such dilution he is retested with a portion of the standardized antigen concentrate as supplied to the physician.

The number of skin tests given at this time is determined by general physical condition and by the severity of the patient's arthritic symptoms. After the first skin tests the patient is instructed to report all reactions which he might observe between the time of tests and the next visit.

On inspecting the skin reaction 24 hours after the first skin test, the grade of sensitiveness of this patient can be readily established. This is recorded on a chart which permits the choice of dosage for the next skin test.

The skin reactions manifest themselves as follows:

1. No reaction.
2. Mild to severe skin reaction without general or joint reaction.
3. Mild to severe skin reaction with amelioration of arthritic symptoms. Lessening of pain, stiffness and soreness.)
4. Mild to severe skin reaction with exacerbations of symptoms. (Avoided by diluting antigens.)

The patients with negative reactions are skin tested again and observed 24 hours later.

All patients excepting those with negative skin and general reactions are permitted to rest for 3 to 4 days, and are instructed to record their observations during the rest period. Then further skin tests are performed with either the standardized concentrates or with their dilutions of at least 1 to 10, depending on the grade of skin, joint or general reaction.

After completion of the full course of skin testing, which does not require more than three sittings within ten days, a choice of the proper concentrate is made by consulting the charted data for the concentrate giving the greatest skin reaction combined with a definite amelioration of the symptoms.

The initial dosage in the treatment amounts to 0.02 cc. intradermally and 0.2 cc. intramuscularly. The treatment is continued with these quantities unless either an exacerbation of symptoms or lack of further improvement is noted. In the former instance the intramuscular dose is reduced and in the latter gradually increased.

Frequently, it is necessary to use a combination of toxoids, which may be incorporated into a single solution. The proportions of the constituent toxoids are in the same ratio as expressed by the grade of the skin reaction. The single toxoids are used separately in alternate treatments if only two toxoids give positive skin reactions.

A satisfactory alternative is the treatment of the patients with one of the toxoids to which they are skin and joint sensitive, up to the point where a certain indifference on the part of the patient is noticed. This indifference is manifested by the patient's reaction to the injection in not noticing any particular difference in his condition after injection. An increase in the established dose or a change to another toxoid is indicated.

The experience in dosage is not uniform in all patients. A micro-dosage is indicated in patients with active, painful and swollen joints. In cases of long standing, with less active joint symptoms, a dose 5 to 10 times the usual amount is appropriate.

According to my experience with patients seen in the office and clinic, a semi-weekly treatment is indicated. Clinic patients receiving only one weekly treatment, especially in the beginning, report good results for 3 to 4 days following the treatment, with a recurrence of their symptoms for the remaining days.

At the stage where the patient claims to be in normal physical condition and able to accomplish his daily work, he is asked to reappear in the clinic or office at 14-day intervals for further observation. No treatment is given unless he reports recurrence of symptoms.

It will be understood that the desensitizing treatment with my concentrated toxoid is not intended to replace the use of other measures that are presently employed by the physician such as the removal of any known focus of infection. Immunization with my concentrated toxoid previous to removal of any known focus of infection is advocated for prevention of spread of infection following surgical intervention. While some dramatic and sensational cures have been reported by the removal of such foci, it is equally clear that the removal of a focus of infection after sensitization of the joints has taken place will add little to the improvement of the arthritic patient. In those cases, and this a large majority, where such foci of infection cannot be found, as well as in those where such foci have been removed, the use of my concentrated toxoids is advanced as a means of desensitization. It is to be understood that any other complications such as metabolic, endocrine and other disabling complication such as anemia, &c., which would thwart results of the effect of desensitization are treated in a similar manner as would be expected in a human not having arthritis.

The concentrates prepared according to my invention have the further advantage as compared with the use of culture filtrates or killed bacteria, as has been proposed by others, that they are as experimentally proved not toxic and also do not give rise to the so-called "negative phase" in which the resistance of the animal or patient is lowered and which is accompanied by a temporary lowering of the number of leucocytes in the blood. In my tests, using at least six animals in each series, I have taken counts of the leucocytes and the polymorpho-nuclears before injection and then repeated the counts 1½, 3½, 24, 48 and 72 hours after each injection. I have observed what seems to be a remarkable fact that when my concentrate is used, there is no tendency to develop the negative phase. On the contrary, injection of my concentrate is followed by stimulating effect on the blood forming organs and is expressed by a moderate increase in the total number of leucocytes and polymorpho-nuclears.

It will be understood that various changes in the procedure for preparing and standardizing the antigen concentrates may be applied within the skill of the art.

It will be understood that various other acids may be used in place of salicylic acid as the acid constituent of the precipitating mixture. Besides salicylic acid, I have used benzoic acid, anthranilic acid, phthalic acid, dinitrobenzoic acid and stearic acid. Various other organic acids that are soluble in organic solvents miscible in water but that are relatively insoluble in water may be used. Likewise dioxane, isopropyl alcohol, ethyl or methyl alcohol as well as many other organic solvents miscible in water may be substituted for acetone as the solvent. The precipitation of the toxoid may be explained as a co-precipitation of the toxoid and the acid with the acid being removed from admixture with the precipitated toxoid by washing with a suitable solvent, as, for example, with a further quantity of the solvent used in the initial precipitation. In the case where either methyl or ethyl alcohol is used as the solvent, the active toxoid material will be taken up in solution in the alcohol-acid mixture from which it may be recovered by addition to the separated mixture of one of the other solvents above mentioned in an amount sufficient to insure separation or desired fractionation. It will be understood that the regulation of the pH of the acid solution is only critical to the extent that the solution should be kept sufficiently on the acid side to insure that the acid does not form salts which remain in solution while at the same time keeping the pH above the point where injury to the toxoid values will occur.

The above method of precipitating the toxoid is capable of more general application in concentrating and recovering toxoid values from filtrates of various bacterial groups and strains. By way of example it may be applied in preparing the toxoids specific to diphtheria, tetanus and the various staphylococci. Toxoid concentrates may also be prepared by my method for use in place of most of the vaccines used today, such as gonococcus, dysentery and the typhoid group, the Brucella group, and the Dick toxins used in dealing with scarlet fever. My method may also be used in preparing toxoid concentrates for the treatment of skin lesions produced by pathogenic fungi. It will be understood that the details of the procedure for cultivating the particular bacteria, the culture medium, etc., will be varied and determined according to standard practices and that the period of cultivation will be selected after appropriate tests to insure that the culture filtrate will be of a satisfactory character in respect to purity, morphology, staining properties and other general characteristics.

It will be understood that where hereinbefore I have referred to toxoid concentrates as derived from hemolytic streptococci and their standardization and use in treating arthritic patients, I intend that such use shall apply equally to the production of toxoid concentrates, their standardization and use in treating allied diseases such as rheumatic fever and other allergic diseases due to bacterial toxins.

I claim:

1. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, then killing the organisms of the culture, removing the killed organisms and recovering the produced toxoid in the form of a clear aqueous solution, acidifying such solution sufficiently to insure precipitation of any salts formed as a result of the addition of a relatively water insoluble organic acid, mixing said acidified aqueous solution with a solution of a relatively water insoluble organic acid in a readily water miscible organic solvent, and thereby precipitating the toxoid content of said solution along with said organic acid, and thereafter separating the toxoid from said acid.

2. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, then killing the organisms of the culture and filtering to separate a clear filtrate from the killed organisms, treating the clear filtrate with a solution of a relatively water insoluble organic acid in a readily water miscible organic solvent, and thereby precipitating the toxoid content of said filtrate along with said relatively water insoluble acid, and thereafter separating the toxoid from said acid.

3. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, then killing the organisms of the culture and filtering to separate a clear filtrate from the killed organisms, treating the clear filtrate with a substantially saturated solution of benzoic acid in a liquid organic solvent for said acid that is miscible in water, and thereby precipitating the toxoid content of said filtrate.

4. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, then killing the organisms of the culture and filtering to separate a clear filtrate from the killed organisms, treating the clear filtrate with a solution of salicylic acid in acetone and thereby precipitating the toxoid content of said filtrate.

5. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, then killing the organisms of the culture and filtering to separate a clear filtrate from the killed organisms, treating the clear filtrate with a saturated solution of salicylic acid in acetone and thereby precipitating the toxoid content of said filtrate, and washing the precipitate with acetone to free the same from salicylic acid.

6. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, then killing the organisms of the culture and recovering the toxoid values from the killed organisms in the form of a clear aqueous solution, treating said aqueous solution with a solution of a relatively water insoluble organic acid in a readily water miscible organic solvent, and thereby precipitating the toxoid content of said aqueous solution along with said relatively water insoluble organic acid, thereafter separating the toxoid from said organic acid, and finally standardizing the toxoid concentrate according to its ability to produce an indicative skin reaction in an arthritically sensitized rabbit.

7. A composition of matter adapted for use in the desensitizing treatment of rheumatoid, osteo or mixed arthritic patients, which comprises the toxoid precipitate produced by treating an aqueous filtrate from the killed organisms of a culture of a virulent strain of hemolytic streptococci capable of producing non-suppurative arthritis in rabbits or mice with a saturated salicylic acid solution in an organic solvent miscible in water and thereby precipitating the toxoid content of said filtrate, and thereafter separating the precipitate from the resulting mixture.

8. As a new product, the toxoid of a strain of hemolytic streptococci capable of producing non-suppurative arthritis in rabbits and mice, said product being free from any tendency to give rise to a negative phase in an experimental animal or human patient when introduced intravenously or intramuscularly by repeated injections of from .5 to 5 cc., and said product having been produced by treating the aqueous filtrate of killed organisms of the said strain of hemolytic streptococci with a solution of a relatively water insoluble organic acid in a readily water miscible organic solvent, and thereby precipitating the toxoid content of said filtrate along with said water insoluble acid, and thereafter separating the toxoid from said acid.

9. A composition of matter adapted for use in the desensitizing treatment of rheumatoid, osteo or mixed arthritic patients, which comprises the toxoid precipitate obtained by preparing a virulent culture from a strain of hemolytic streptococcus capable of producing non-suppurative arthritis in rabbits or mice if used as a vaccine, then removing the bacterial organisms and recovering the produced toxin in the form of a clear aqueous solution free from bacterial organisms, acidifying such solution sufficiently to insure precipitation of any salts formed as a result of the addition of a relatively water insoluble organic acid, mixing said acidified aqueous solution with a solution of a relatively water insoluble organic acid in a readily water miscible organic solvent, and thereby precipitating the toxoid content of said solution along with said relatively water insoluble acid, and thereafter separating the toxoid from said acid.

10. The process of preparing concentrated toxoids which comprises providing a culture from a selected virulent bacterial strain, killing the organisms of the culture and filtering to obtain an aqueous filtrate from the killed organisms, treating the filtrate with a solution of a relatively water insoluble organic acid in a readily water miscible organic solvent and thereby precipitating the toxoid content of said filtrate, and thereafter separating the precipitate from the resulting mixture.

11. The process of preparing concentrated toxoids adapted for use in desensitizing the joints and joint tissues of rheumatoid, osteo or mixed arthritic patients, which comprises selecting from among a plurality of strains of hemolytic streptococci a strain which exhibits the ability to produce non-suppurative arthritis in rabbits or mice, preparing a virulent culture from the selected strain, removing the bacterial organisms and recovering the produced toxin in the form of a clear aqueous solution free from bacterial organisms, acidifying such solution sufficiently to insure precipitation of any salts formed as the result of addition of a relatively water insoluble organic acid, mixing said aqueous solution with a solution of a relatively water insoluble organic acid in a readily water miscible organic solvent, and thereby precipitating the antigenic content of said solution along with said organic acid, and thereafter separating the antigens from said acid.

12. As a new product adapted for use in the desensitizing treatment of rheumatoid, osteo, or mixed arthritic patients, the toxoid precipitate obtained by preparing a virulent culture from a strain of hermolytic streptococci capable of producing non-suppurative arthritis in rabbits and mice, removing the bacterial organisms and recovering the produced toxin in the form of a clear aqueous solution free from bacterial organisms, acidifying such solution sufficiently to insure precipitation of any salts formed as the result of addition of a relatively water insoluble organic acid, mixing said aqueous solution with a solution of a relatively water insoluble organic acid in a readily water miscible organic solvent, and thereby precipitating the toxoid content of said solution along with said organic acid, and thereafter separating said toxoid from said acid.

JOSEF HOFFMANN.